United States Patent [19]

Fletcher

[11] Patent Number: 5,050,671
[45] Date of Patent: Sep. 24, 1991

[54] PANEL HEAT EXCHANGERS FORMED FROM THERMOPLASTIC POLYMERS

[75] Inventor: Eldon L. Fletcher, Kingston, Canada

[73] Assignee: Du Pont Canada Inc., Mississauga, Canada

[21] Appl. No.: 521,497

[22] Filed: May 10, 1990

[30] Foreign Application Priority Data

May 12, 1989 [GB] United Kingdom ............... 8910966

[51] Int. Cl.$^5$ ............................................. F28F 3/08
[52] U.S. Cl. ..................................... 165/166; 165/148
[58] Field of Search ............................... 165/166, 148

[56] References Cited

U.S. PATENT DOCUMENTS

| 3,258,832 | 7/1966 | Gerstung | 165/148 |
| 3,341,925 | 9/1967 | Gerstung | 165/148 |
| 3,372,743 | 3/1968 | Pall et al. | 165/166 |
| 4,011,905 | 3/1977 | Millard | 165/166 |
| 4,249,597 | 2/1981 | Carey | 165/166 |
| 4,668,443 | 5/1987 | Rye | 165/166 |

FOREIGN PATENT DOCUMENTS

| 163069 | 6/1954 | Australia | 165/166 |
| 00206836 | 12/1986 | European Pat. Off. | |
| 0286399 | 10/1988 | European Pat. Off. | |
| 0286400 | 10/1988 | European Pat. Off. | |
| 0287271 | 10/1988 | European Pat. Off. | |
| 0302261 | 2/1989 | European Pat. Off. | |
| 2600996 | 7/1976 | Fed. Rep. of Germany | 165/166 |
| 2523287 | 9/1983 | France | |
| 2045423 | 10/1980 | United Kingdom | |

Primary Examiner—John Rivell
Assistant Examiner—L. R. Leo

[57] ABSTRACT

A panel heat exchanger formed from two sheets of thermoplastic polymer is disclosed. Each sheet has a thickness of 0.07–0.7 mm and a plurality of grooves extending at least partially across the width of the sheet. Each sheet has a recess located at at least one end. The sheets are superimposed in face to face relationship and bonded together in a fluid tight bond such that (i) the recesses form portions of inlet and outlet header means at opposite ends of the panel, and (ii) the grooves form a plurality of fluid-flow channels between the inlet and outlet header means. The end of each groove of one sheet of the panel heat exchanger overlays the end of a groove of the other sheet. The panel heat exchangers are readily fabricated by simple means, preferably from polyamide compositions. The heat exchangers may be used in a variety of end-uses, including automotive oil coolers, automotive comfort heaters, refrigerators and industrial uses.

13 Claims, 4 Drawing Sheets

PANEL HEAT EXCHANGERS FORMED FROM THERMOPLASTIC POLYMERS

The present invention relates to plate or panel heat exchangers formed from thermoplastic polymers, especially from polyamides, and to a process for the manufacture of such heat exchangers.

Heat exchangers fabricated from heat conductive materials e.g. metals, are well known and are used in a wide variety of end uses for the heating or cooling of liquids and/or gases. Such end uses include air conditioning, refrigeration and industrial uses, the cooling of power trains in automotive and other vehicles and for controlling the temperature of passenger compartments i.e. as comfort heat exchangers. Heat exchangers have tended to be of a core type or of a tube type, and for use in a liquid/liquid or liquid/air mode. Plate or panel heat exchangers are, however, also known and are generally characterized by passage of air over the relatively planar surface of that type of heat exchanger.

It has been traditional to fabricate heat exchangers, including plate heat exchangers, from a heat conductive metal, especially aluminum. Aluminum offers the advantages of rapid conduction of heat through the metal, and strength characteristics that are suitable for many end uses. However, it is difficult to form metals, including aluminum, in an economical manner into thin, light weight, structures having adequate strength.

In contrast, thermoplastic polymers are frequently relatively easy to form into thin structures, especially into film or sheet, but have poor heat transmission characteristics, especially in comparison to metals. A tube-type heat exchanger has, however, been developed using a thermoplastic polymer viz. polytetrafluoroethylene, and such heat exchangers have found use in corrosive environments.

Plate or panel heat exchangers manufactured from thermoplastic polymers, and methods for the manufacture of such heat exchangers, are disclosed in published European patent applications No. 0 287 271 of A.J. Cesaroni, published 1988 October 19, and Nos. 0 286 399 and 0 286 400 of A.J. Cesaroni and J.P. Shuster, published 1988 October 10.

It has now been found that panel heat exchangers may be formed from sheets of thermoplastic polymers in a simple manner that offers flexibility in design.

Accordingly, the present invention provides a panel heat exchanger comprised of two sheets formed from a thermoplastic polymer, each sheet having a thickness of 0.07 to 0.7 mm and a plurality of elongated grooves extending at least partially across the width of each sheet, each of said sheets having a recess located at at least one end of the sheet; said sheets being superimposed in face to face relationship and bonded together in a fluid-tight bond around the edges thereof such that (i) the recesses form portions of inlet and outlet header means at opposite ends of the panel and (ii) the grooves form a plurality of fluid-flow channels between the inlet and outlet header means, the end of each groove of one sheet overlaying the end of a groove in the other sheet.

In a preferred embodiment of the panel heat exchanger of the present invention, the grooves are inclined at an angle of between 20 and 70 degrees, especially between 30 and 60 degrees, to the axis between the inlet and outlet header means.

In a further embodiment, the ends of said grooves are spaced apart from the edge of the sheet.

In another embodiment, the grooves in each sheet are spaced apart and not interconnected.

In a further embodiment, the sheets are elongated, especially elongated with parallel edges.

In a still further embodiment, the channels have a width of at least one mm and a depth of at least 0.25 mm.

In yet another embodiment, the grooves are linear, especially linear and parallel with their respective ends substantially equidistant from the edge of the sheet.

The present invention also provides a sheet formed from a thermoplastic polymer, said sheet having a thickness of 0.07 to 0.7 mm and a plurality of spaced apart elongated grooves extending at least partially across the width of said sheet, said sheet having a recess located at at least one end thereof that is in fluid-flow communication with at least one groove.

In a preferred embodiment of the sheet of the present invention, the grooves are inclined at an angle of between 20 and 70 degrees, especially between 30 and 60 degrees, to the longitudinal axis of the sheet.

In a further embodiment, the grooves have a width of at least one mm and a depth of at least 0.25 mm.

In another embodiment, the grooves are parallel with their respective ends spaced apart from and substantially equidistant from the edge of the sheet.

In yet another embodiment, the sheet is substantially planar.

In a further embodiment, the grooves are linear.

The present invention will be described with particular reference to the embodiments shown in the drawings in which.

The drawings show an embodiment of a panel heat exchanger that is elongated and substantially planar. It is to be understood, however, that the panel heat exchanger may be of other shapes e.g. formed from sheets that are not elongated, which have sides that are not parallel to each other and/or which are not substantially planar i.e. are curved.

Figure 1:
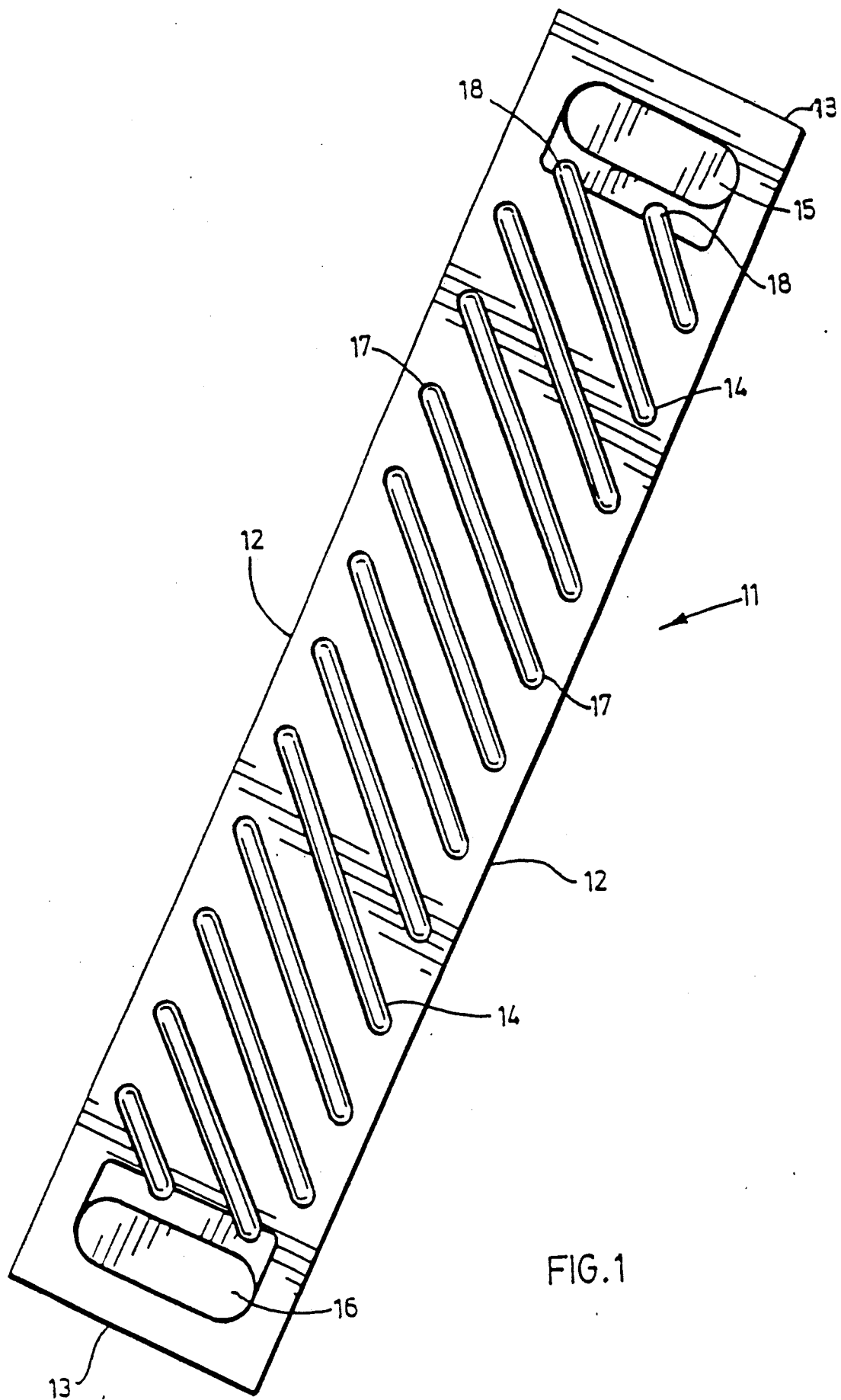
FIG. 1 is a plan view of an embodiment of sheet of the present invention.

FIG. 1 shows a sheet, generally indicated by 11, having edges 12 and ends 13; in the embodiment shown in FIG. 1, edges 12 are parallel to each other and sheet 11 is elongated. Sheet 11 has a plurality of grooves 14 located between inlet header recess 15 and outlet header recess 16. Each groove 14 has ends 17 which are located in the proximity of but in a spaced apart relationship from edges 12. Grooves 14 are shown to be linear and parallel but inclined at an angle to edges 12; it is however not necessary for the grooves to be linear and/or parallel. As will be apparent from the description hereinafter, it is more important for the ends of the grooves in each sheet to be such that on superimposing two sheets in a face to face relationship, the ends of each groove of one sheet are superimposed over i.e. overlay, the ends of a groove of the other sheet. Grooves 14 in the proximity of inlet header recess 15 are shown as meeting with recess 15 at groove ends 18; at least one of groove ends 18 must meet i.e. be in fluid-flow communication with, recess 15, and similarly at least one of groove ends 18 must meet recess 16. As shown in FIG. 1, grooves 14 are not interconnected.

Figure 2:
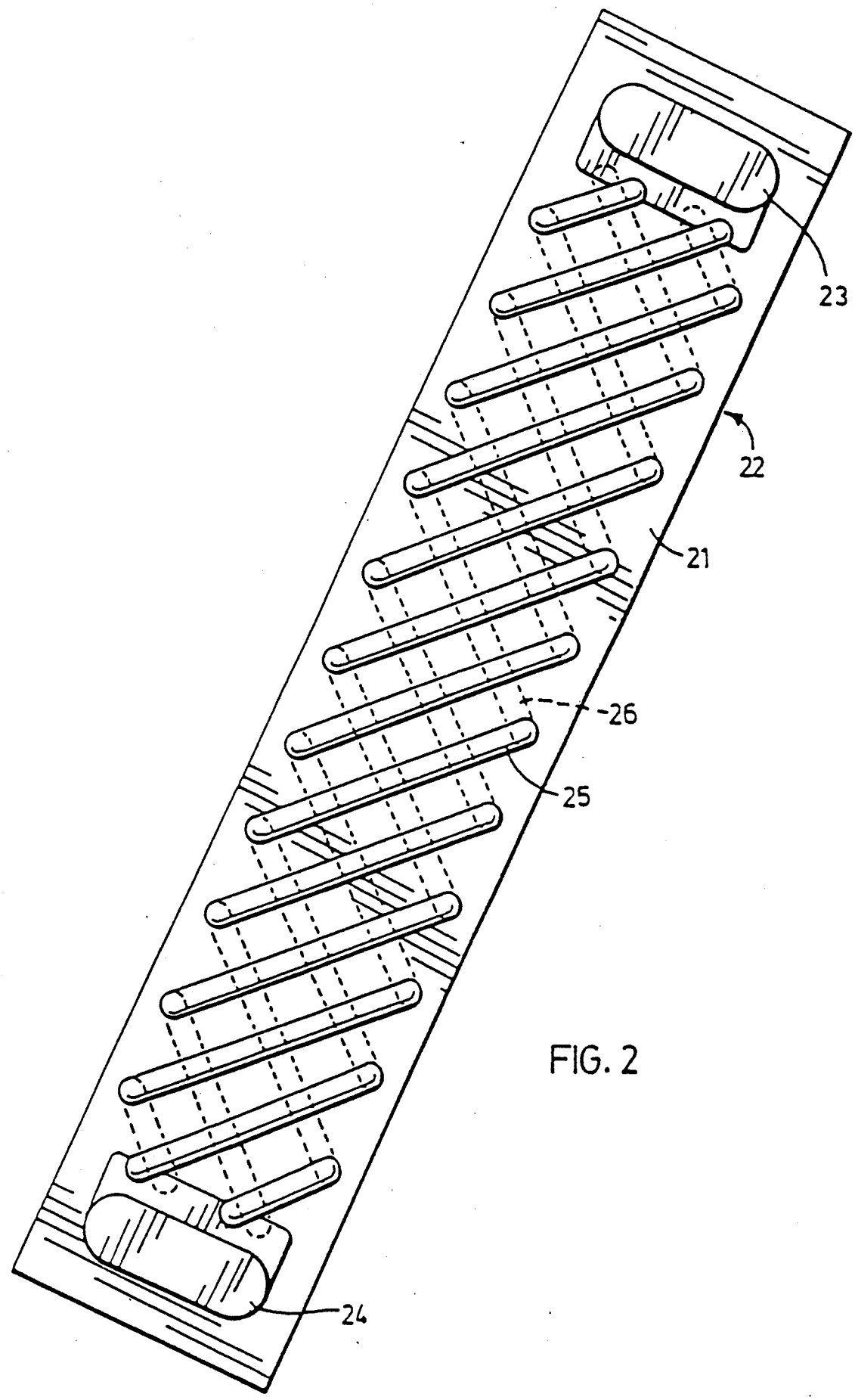
FIG. 2 is a plan view of two superimposed sheets in face to face relationship.

In FIG. 2, first sheet 21 is shown as superimposed on second sheet 22. As shown in FIG. 2, each of sheets 21 and 22 are the same as elongated sheet 11 of FIG. 1, and have been superimposed on each other in a face to face relationship. Header recesses 23 and 24 have been formed between sheet 21 and sheet 22. Sections of grooves 25 of first sheet 21 overlay sections of grooves 26 of second sheet 22 so as to form a grid pattern of fluid flow channels. Ends of grooves 25 are shown to overlay ends of grooves 26. As is illustrated in FIG. 2, some of grooves 25 and 26 are in fluid flow communication with header recesses 23 and 24.

Figure 3:
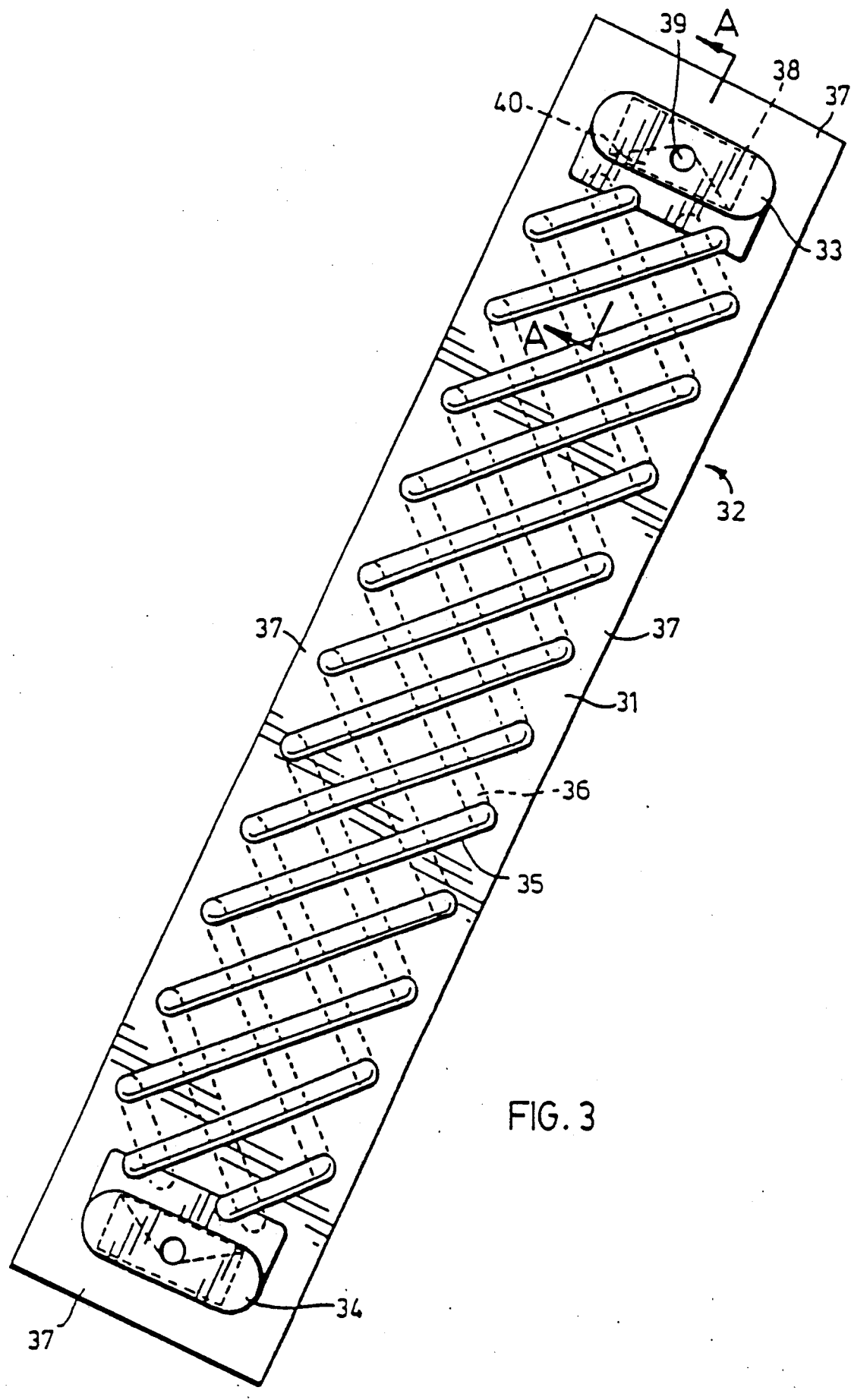
FIG. 3 is a plan view of an embodiment of a panel heat exchanger.

FIG. 3 is similar to FIG. 2, except that the representation is of a panel heat exchanger. A first sheet 31 is shown as superimposed on a second sheet 32, with header recesses 33 and 34 being formed between the sheets. Sections of grooves 35 of first sheet 31 overlay sections of grooves 36 of second sheet 32 so as to form a grid pattern of fluid flow channels. Ends of grooves 35 are shown to overlay ends of grooves 36. Some of grooves 35 and 36 are in fluid flow communication with header recesses 33 and 34. Sheets 31 and 32 are sealed together e.g. along edges 37, in a fluid tight seal, it being understood that sheets 31 and 32 are preferably sealed together at areas other than the locations of grooves 35 and 36 and recess areas 33 and 34. Each of recess areas 33 and 34 contains a distributor 38. Distributor 38 has an axial orifice 39 that is in fluid flow communication with the channels formed by grooves 35 and 36, by means of gate 40; as shown in FIG. 3, gate 40 is V-shaped in plan view, extending substantially over the width of the distributor ring 38, but a plurality of gates may be used to communicate with each of the grooves 35 and 36 that meet recesses 33 and 34.

Figure 4:
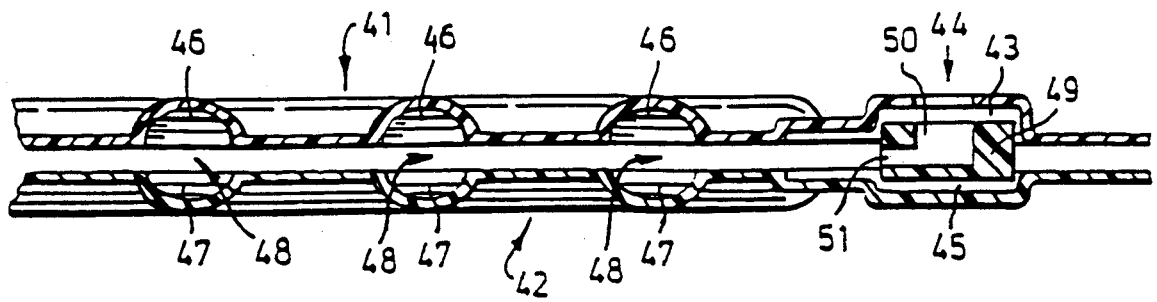
FIG. 4 is an exploded side view of a section of a panel heat exchanger, through line A—A of FIG. 3.

FIG. 4 shows first sheet 41 superimposed on second sheet 42. Each of sheets 41 and 42 is of the type shown in FIGS. 1-3. Recess 43 of sheet 41 is shown as having an inlet (or outlet) orifice 44 through the sheet, whereas in the embodiment shown recess 45 of sheet 42 does not have an orifice; recesses 43 and 45 together form the header recesses that are referred to as 33 and 34 in FIG. 3. Sheet 41 is shown as having grooves 46 therein and sheet 42 is shown as having grooves 47 therein; grooves 46 and 47 form the fluid flow channels of the panel heat exchanger. Grooves 46 are inclined in opposite directions to grooves 47 e.g. grooves 46 are inclined towards the right whereas grooves 47 extend towards the left, and have common points e.g. groove intersection 48. Groove intersection 48 is conducive to the admixing of and exchange between fluid passing through groove 46 with fluid passing through groove 47. At least one of the grooves 46 or 47, and especially at least one of each of grooves 46 and 47, is in fluid flow communication with the header means formed by recesses 43 and 45, respectively. The header recess formed by recesses 43 and 45 contains distributor 49, that has an axial orifice 50 and gate 51, the latter being in fluid flow communication with at least one of grooves 46 and 47. Axial orifice 50 is in fluid flow communication with both orifice 44 of sheet 41 and gate 51.

One example of a distributor is disclosed in published European patent application No. 0 304 261 of A.J. Cesaroni, published 1989 February 22. For example, a distributor may be placed in the header recess and connected e.g. by threaded connections, to a distribution pipe. A flange may be located external to the panel heat exchanger, in contact with the external surface of the sheet, to assist in obtaining a fluid tight seal of distributor 49 to a distribution pipe.

Figure 5:
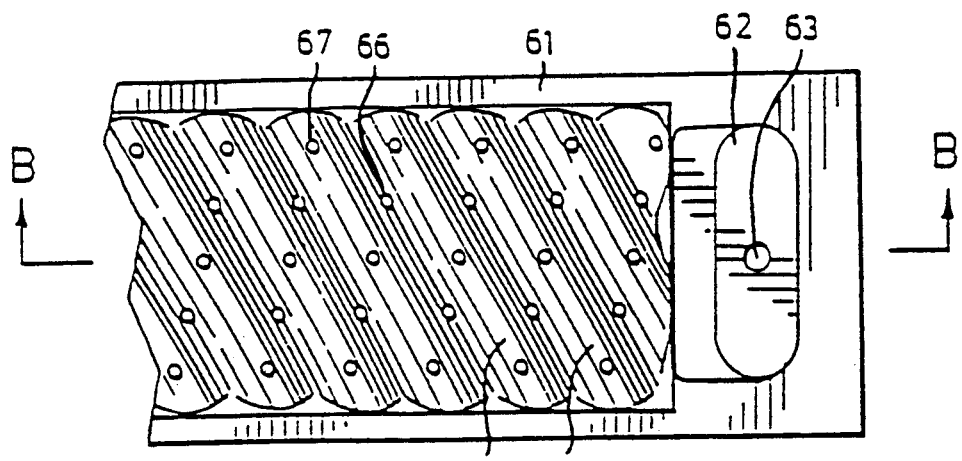
FIG. 5 is a plan view of another embodiment of a panel heat exchanger.

FIG. 5 is similar to FIG. 3, except that the fluid flow channels are sinusoidal and projections are shown on the surface of the sheets of the panel heat exchanger. Sheet 61, being the only sheet of the heat exchanger that is shown, has a header recess area 62 that has an orifice 63 through which fluid flows to or from the heat exchanger. The heat exchanger has a plurality of grooves, as represented by grooves 64 and 65. Grooves 64 and 65 are linear and parallel to each other, and in cross-section are sinusoidal in shape, as is more readily seen in FIG. 6. Grooves 64 and 65 are, in the embodiment shown, at an angle of about 30° to the longitudinal axis of the heat exchanger. Correspondingly, the grooves of the sheet on the underside of the panel heat exchanger (not shown) are at an angle of about 60° to the longitudinal axis. In addition to the sinusoidal grooves, the embodiment of FIG. 5 is shown as having projections 66 extending from the surface of the panel heat exchanger in the troughs between grooves, as well as projections 67 extending from the peaks of the grooves. Such projections may be located, preferably uniformly, throughout the surface of the panel heat exchanger. Similarly, projections may be located on the internal surface of sheet 61, such that the projections extend into the fluid flow channels formed between the sheets of the panel heat exchanger.

Figure 6:
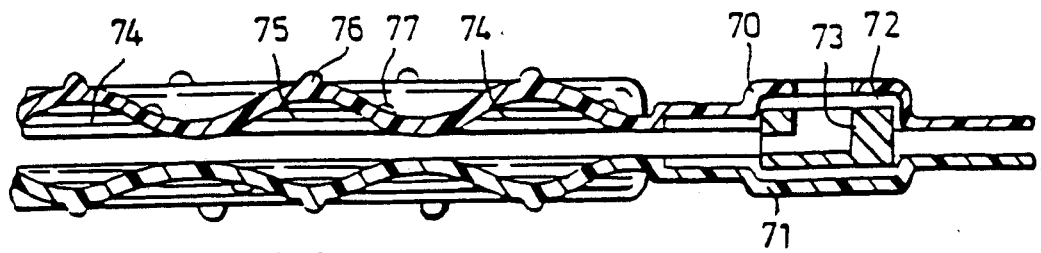
FIG. 6 is an exploded side view of a section of a panel heat exchanger, through line B—B of FIG. 5.

FIG. 6 is similar to FIG. 4, but shows a cross-section of the embodiment of FIG. 5. Sheets 70 and 71 have a header recess area, generally indicated by 72, that contains a distributor 73. Sheet 70 has a plurality of grooves 74 that are sinusoidal in cross-section. One such groove, groove 75, is shown as having a projection 76 extending from the peak thereof. In addition, projections 77 are shown as extending from the surface of sheet 70 in the troughs adjacent to channel 75. Such projections may be located throughout sheet 70, and sheet 71, and may include projections on both the internal and external surfaces of the sheets.

In a preferred embodiment of the present invention, a plurality of panel heat exchangers of the type shown in FIGS. 3 and 4 would be stacked on top of each other in fluid flow communication through a header system connecting at orifices 44; in such an embodiment, sheet 42 of FIG. 4 might have an orifice corresponding to orifice 44 of sheet 41. Such panel heat exchangers could be arranged so that fluid would flow through the panel heat exchangers in series or in parallel. The actual fluid flow path could depend on a number of factors, including the amount of exchange of heat required between fluid within the heat exchanger and fluid outside of the heat exchanger i.e. between fluid to be cooled or heated and vice versa. Suitable header means would be required. It may be preferable to use spacers between the individual heat exchangers of a stack of heat exchangers; such spacers may be fabricated separately from the parts of the headers or fabricated as part thereof.

In embodiments of the invention, means are provided in the grooves of the panel to cause turbulence in the fluid. Such means may be more beneficial when the liquid passing through the heat exchanger is relatively viscous e.g. for oil rather than water. The means may be indentations, projections or the like in the fluid flow channels, through which fluid is intended to flow through the heat exchanger, and thereby cause turbulence in the fluid. Means to cause turbulence may also be on the external surface, in order to cause turbulence in the fluid e.g. air or liquid, passing over the surface of the panel heat exchanger for the exchange of heat. Such means may formed in the sheets during the manufacture thereof.

The panel heat exchanger of the present invention may be assembled without the use of gaskets or the like, or using one or more of gaskets or the like.

In one method of fabrication of the panel heat exchanger of the present invention, the sheets may be thermoformed using a grooved thermoforming mould, including using a continuous thermoformer, or pressed using a grooved mould. The resultant grooved sheets are then placed in a face to face relationship and bonded together. With some polymers, the sheets may be thermally bonded or heat sealed together whereas with other polymers, it may be necessary to use coatings and/or adhesives to facilitate bonding of the sheets. If the sheets are formed from a polyamide, it is preferred that a coating be used to facilitate the bonding of the polyamide sheets. Although the sheet may be coated in a pattern corresponding to the pattern of the bonding of the sheets in the fabrication of the heat exchanger, it will normally be most convenient and preferred that the entire surface of the sheet be coated. Examples of coatings are described in the aforementioned applications of Cesaroni and Shuster.

The first and second sheets of the panel heat exchanger are preferably brought into contact in a face-to-face manner, with any coating at the interface between the sheets, between moulds of a press; the moulds are heated e.g. to a temperature sufficient to effect bonding of the two sheets. A distributor will usually be inserted between the sheets at the location of the inlet and outlet header means. The end faces of the distributor will normally be coated with the coating composition, if used. On sufficient heating of the sheets, bonding is effected between the two sheets and between the sheets and the distributor, thereby locating the distributor between the sheets at the locations of the inlet and outlet header means; a fluid tight seal is preferred.

In an alternate method of fabrication, the inlet and outlet header means may be formed to the required shape by use of a spacer having a shape similar to that of the distributor, the spacer being formed from a metal or other material that will not bond to the sheets under the influence of heat and pressure applied in the press. The sheets are partially bonded together, using heat and pressure, in such a manner that the spacer may be removed from between the sheets by mechanical means and replaced with the distributor. Subsequently, the bonding of sheets and distributor is completed. Such an alternative method of fabrication may assist in the forming of the recesses and fabrication of the panel heat exchanger in a more uniform and acceptable manner.

The panels of the heat exchanger require orifices at the location of the inlet and outlet header means. Such orifices may be provided in the sheets before the sheets are placed between the moulds of the press, but preferably are formed in the sheets after any coating of the sheets. Alternatively, the orifices may be cut from the panel heat exchanger after forming e.g. by use of a trimming knife, hot wire or other cutting tool.

In alternate embodiments of the process, sheets of polymer are inserted between two moulds; such moulds have grooves corresponding to the fluid flow passages to be formed in the sheets, and a recess to accommodate the part of the panel heat exchanger corresponding to the location of the distributor i.e. the location of the inlet and outlet header means. The mould is preferably attached, especially in a detachable manner, to a press platen, thereby facilitating expeditious changing of the pattern formed in the sheet. After the sheets are placed between the moulds in a press, the moulds are heated e.g. to a temperature above the softening point of the polymer, and a gas, usually an inert gas e.g. nitrogen, is forced between the sheets e.g. through the distributor at a pressure above atmospheric pressure. The pressure of gas causes the fluid flow channels to form; the two sections of the mould may be slowly moved apart after the polymer of the sheets has been heated so as to assist in the forming of the fluid flow channels. The gas is preferably flushed through the heat exchanger during and/or after the forming of the fluid flow channels, which tends to remove any volatile components of any coating, especially if the coating is a composition of benzyl alcohol, phenol and polyamide, as disclosed in the aforementioned published European patent application No. 0 287 271. Subsequently, prior to removal of the panel heat exchanger thus formed from between the moulds and with gas pressure still being applied, the temperature of the panel heat exchanger should be increased to above the expected operating temperature of the heat exchanger, in order to reduce distortion during use of the heat exchanger.

In operation, a fluid that is to be heated or cooled would enter the panel heat exchanger through recess orifice 44, pass through the distributor 49 via orifice 50 and gate 51 and then enter grooves 46 and 47 that form fluid flow channels. The fluid would then flow along the grooves until an intersection 48 between grooves was reached. At the intersection, some fluid in groove 46 could pass over the top of some fluid in groove 47 and continue along the groove. However, at the interface between fluid in groove 46 and fluid in groove 47, turbulence would be created and admixing of the fluid from the two grooves would occur. Such admixing would have beneficial effects, including reduction of streaming of the fluid in grooves 46 and 47 and hence improvement in the effectiveness of the heat exchanger. The fluid would pass from the panel heat exchanger through an outlet distributor similar to the inlet distributor. A second fluid having a temperature different from that of the fluid passed through the panel of the panel heat exchanger would be passed over the surface of the panel heat exchanger.

In cold weather, especially below about $-15°$ C., oil tends to become very viscous. On starting a motor under such conditions, the oil pressure obtained may be substantially above normal operating pressures. In order to reduce the possibility of damage to a panel heat exchanger under such circumstances, the heat exchanger may be equipped with a by-pass system so that cold viscous oil passes from the inlet to the outlet without passing through the fluid flow channels. This may be accomplished using a heat activated by-pass valve that passes cold oil through alternate passages that go directly from inlet to outlet until such time as the oil reaches a predetermined temperature at which time the valve directs the oil through the fluid flow channels of the heat exchanger.

In embodiments of the invention, especially when the intended use is in environments containing ethylene glycol, the sheets that form the panels are preferably formed from a polyamide. The particular polyamide selected will depend primarily on the end use intended for the heat exchanger, especially the temperature of use and the environment of use, e.g. the fluid that will be passed through the heat exchanger and the fluid external to the heat exchanger. The polyamide may contain stabilizers, pigments, fillers and other additives known for use in polymer compositions.

Examples of such polyamides are the polyamides formed by the condensation polymerization of an aromatic or aliphatic dicarboxylic acid having 6-12 carbon atoms with an aliphatic primary diamine having 6-12 carbon atoms. Alternatively, the polyamide may be formed by condensation polymerization of an aliphatic lactam or alpha, omega aminocarboxylic acid having 6-12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedioic acid and terephthalic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively. In preferred embodiments, the polymer is a polyamide that has been filled with glass-fibre, especially such a polymer that is a toughened polyamide e.g. toughened by addition of polymers having elastomeric or rubbery properties.

The polymer of the distributor may be similar to that of the sheets. However, different polymers may be used, provided that such polymers may be bonded to the polymers of the sheets and/or coating on the sheet, whichever contacts the distributor. Nonetheless, in preferred embodiments the distributor is fabricated from a so-called engineering polymer, especially a polyamide of the type discussed above.

Sheets of some polymers may exhibit shrinkage during fabrication of the panel heat exchanger, and the amount of shrinkage may vary even within the same general class of polymers e.g. polyamides. Thus the areas of the inlet and outlet header means may need to be designed with some flexibility in positioning of the inlet and outlet header means, especially during manufacture.

Laminated or coated materials may often be utilized with advantage for the sheets, provided that the laminated or coated materials are capable of being formed into the required shape. Such materials could comprise a layer providing the necessary physical resistance and inner and/or outer layers to provide resistance to the working fluids or contaminants. An example of a laminated material is a layer of glass or other fibre in the form of a fabric, laminated between layers of polymer. Composite materials may also be used e.g. glass-filled and fibre-filled composites.

In embodiments in which the polymer is polyamide and each sheet is coated with a benzyl alcohol/phenol/polyamide or benzyl alcohol/phenol/methanol composition, as disclosed in the aforementioned European 0 287 271, then it may be advantageous to insert a film of a polyamide between the first and second sheets. Such a film becomes bonded to the coating and loses its integrity but it has been observed that the use of such a film may result in the production of a panel heat exchanger of more uniform properties.

The panel heat exchangers formed by the method of the present invention have wall thicknesses, at least in those portions where transfer of heat will occur, of less than 0.7 mm, e.g. in the range of 0.07 to 0.7 mm, and especially in the range of 0.07-0.50 mm, particularly 0.12-0.30 mm. At such wall thicknesses, wall thickness is a less significant factor in the operating effectiveness of the heat exchanger. It is to be understood, however, that the polymer composition and the wall thickness must be selected so that the resultant heat exchanger will have the necessary physical properties to be acceptable for the intended end use.

In embodiments of the invention, the fluid flow channels have a width of at least one mm and a depth of at least 0.25 mm. Preferably, the width is at least 2 mm, especially at least 4 mm, and the depth is at least 0.5 mm, especially at least one mm.

The panels and sheet of the present invention have been described with particular reference to the use of polyamides as the polymer used in the fabrication thereof. It is to be understood, however, that other polymers may be used, the principal consideration being the environment of use of the panel heat exchanger e.g. the properties of the fluid passing through and over the panel heat exchanger, the temperature and pressure of use and the like. Examples of other thermoplastic polymers that may be used are polyethylene, polypropylene, fluorocarbon polymers, polyesters, thermoplastic and thermoset elastomers e.g. polyetherester elastomers, neoprene, chlorosulphonated polyethylene, and ethylene/propylene/diene (EPDM) elastomers, polyvinyl chloride and polyurethane.

The present invention provides versatile and relatively simple panel heat exchangers that may be readily fabricated from thermoplastic polymers, especially from polyamides.

The heat exchangers may be used in a variety of end uses, depending on the polymer from which the heat exchanger has been fabricated and the intended environment of use of the heat exchanger. In particular, heat exchangers of the invention may be inserted into the so-called end-tanks of radiators of automobiles or similar vehicles, and used for the cooling of transmission oil. However, while the panel heat exchangers have been described with particular reference to use in automotive end-uses, it is to be understood that the panel heat exchangers fabricated by the process of the present invention may be used in a wide variety of end-uses. Examples of other uses include refrigeration, industrial heating and cooling, solar heating, and medical and consumer end-uses e.g. heating and/or cooling of beds, chairs and car seats.

The present invention is illustrated by the following examples:

EXAMPLE I

Female moulds corresponding to the shape of the elongated sheet of FIG. 1 were formed in an aluminum block, such that the pattern of the sheet had a length of 25.5 cm and a width of 5.2 cm. The mould had 13 channels, corresponding to the fluid flow passages 14 of FIG. 1, with two of the passages at each end of the sheet meeting the recesses of inlet and outlet header areas, as shown in FIG. 1.

Samples of polycarbonate sheet having a thickness of 0.25 mm were vacuum formed using the mould at a temperature of 225° C. The formed sheet had raised passages on one side of the sheet, with the reverse side being planar apart from the indented passages. Two such samples of formed sheet were then placed with planar sides in contact, one sheet being rotated through 180° with respect to the other sheet so a panel as shown in FIG. 2 was obtained. The samples were then taped together or solvent welded together to form representations of panel heat exchangers.

EXAMPLE II

Samples of sheets formed from compositions of 9% by weight of glass fibres in polyhexamethylene adipamide (nylon 66) and having a thickness of 0.25 mm were coated with a mixture of benzyl alcohol, methanol and phenol on one side. The coated sides were placed in face to face contact, between moulds of the type described in Example I; distributor rings were placed at the locations of the inlet and outlet headers. The moulds were then heated in a press at a temperature of 171° C., and nitrogen gas was passed under pressure between the sheets, so that (i) each sheet was formed to the shape of the fluid flow passages during the heating of the mould and (ii) the sheets were bonded together.

A panel heat exchanger of the type shown in FIGS. 3 and 4 was thus formed, with the sheets bonded together, except at the locations of the fluid flow passages, and to opposite end faces of the distributor rings.

EXAMPLE III

The procedure of Example II was repeated using sheets formed from sheets of the glass filled polyamide having thicknesses of 0.37 mm.

Panel heat exchangers were formed using the method of Example II.

EXAMPLE IV

Moulds having a sinusoidal pattern of grooves and having a plurality of indentations in the surface were formed from aluminum block. The indentations were located at the crests and troughs of the grooves in the mould, the crests having two such indentations and the troughs having three such indentations; such indentations result in formation of projections in the sheets formed using the moulds, three on the crests of the grooves of the formed sheet and two in the troughs of the grooves. The indentations in the moulds were circular, with a diameter of approximately 2-2.5 mm and a depth of approximately 1-1.25 mm.

Panel heat exchangers were formed using the procedure of Example II, the sheets of polyhexamethylene adipamide having a thickness of 19 mm.

EXAMPLE V

Eleven panel heat exchangers were formed, six using the procedure of Example IV and five using the same procedure but with moulds that did not have indentations.

Each of the panel heat exchangers thus formed was coated on the exterior surface in the area of the inlet and outlet headers. The panel heat exchangers were then arranged in a stack, alternating panel heat exchangers with projections with panel heat exchangers without projections. The stack of panel heat exchangers was clamped together and placed in an oven at a temperature of 130-150° C. to bond the panel heat exchangers together; the resultant stack had a thickness of approximately 2.2 cm at each end. Orifices were formed at the inlet and outlet headers by cutting away the sheets of each panel heat exchanger of the stack, so the the resultant orifice passed through the stacked inlet and outlet from one side to the other.

I claim:

1. A panel heat exchanger comprised of two sheets formed from a thermoplastic polyamide, each sheet having a thickness of 0.07 to 0.7 mm and a plurality of elongated grooves extending across the width of each sheet with the ends of said grooves being spaced apart from an edge of the sheet, said sheets further having a plurality of projections on at least one groove thereof, each of said sheets having a recess located at at least one end of the sheet; said sheets being superimposed in face to face relationship and bonded together in a fluid-tight bond around the edges thereof such that (i) the recesses form portions of inlet and outlet header means at opposite ends of the panel, (ii) the grooves form a plurality of fluid-flow channels between the inlet and outlet header means, the end of each groove on one sheet overlaying the end of a groove in the other sheet, and (iii) the projections are on at least the surface of the sheets opposed to the surface in face-to-face contact.

2. The panel heat exchanger of claim 1 in which the channels have a width of at least one mm and a depth of at least 0.25 mm.

3. The panel heat exchanger of claim 1 in which the grooves are inclined at an angle of between 20 and 70 degrees to the axis between the inlet and outlet header means.

4. The panel heat exchanger of claim 3 in which the grooves in each sheet are spaced apart and not interconnected.

5. The panel heat exchanger of claim 3 in which the sheets are elongated.

6. The panel heat exchanger of claim 3 in which the sheets are elongated with parallel edges.

7. The panel heat exchanger of claim 3 in which the panel is substantially planar.

8. The panel heat exchanger of claim 7 in which the grooves are linear.

9. The panel heat exchanger of claim 3 in which the grooves are linear and parallel with their respective ends substantially equidistant from the edges of the sheet.

10. A sheet formed from a thermoplastic polyamide, said sheet having a thickness of 0.07 to 0.7 mm and a plurality of spaced apart elongated grooves extending across the width of said sheet with the ends of said grooves being spaced apart from an edge of the sheet, said sheet further having a plurality of projections on at least one groove, said sheet having a recess located at at least one end thereof that is in fluid-flow communication with at least one groove.

11. The sheet of claim 10 in which the grooves are inclined at an angle of between 20 and 70 degrees to the longitudinal axis of the sheet, said grooves having a width of at least one mm and a depth of at least 0.25 mm.

12. The sheet of claim 11 in which the grooves are parallel with their respective ends spaced apart from and substantially equidistant from the edge of the sheet.

13. The sheet of claim 12 in which the sheet is substantially planar and the grooves are linear.

* * * * *